March 7, 1933.  G. J. DAY  1,900,696
OVEN THERMOMETER
Filed Jan. 5, 1932
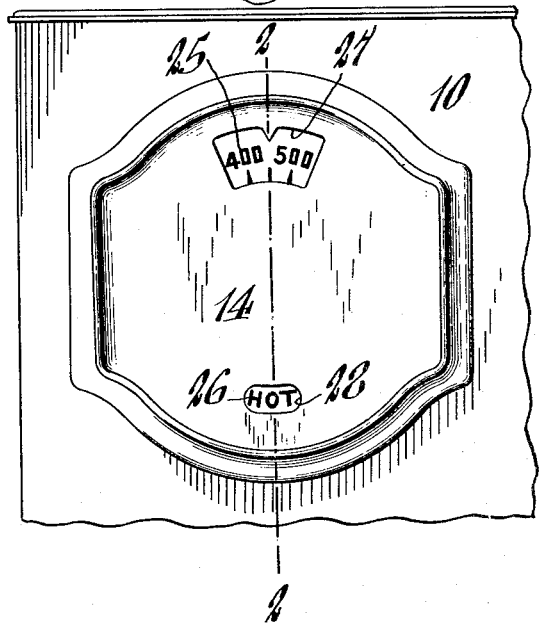
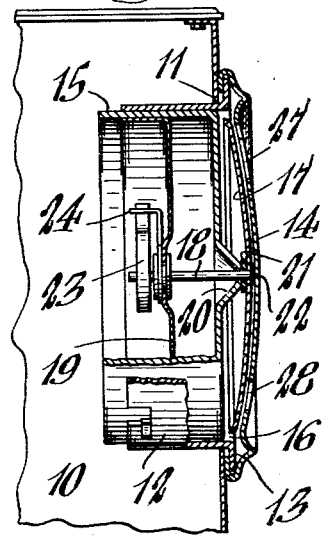
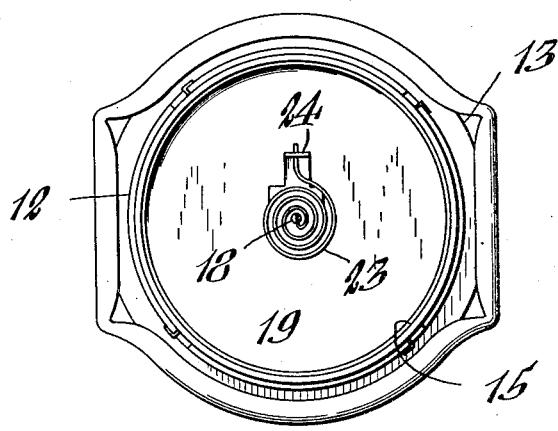
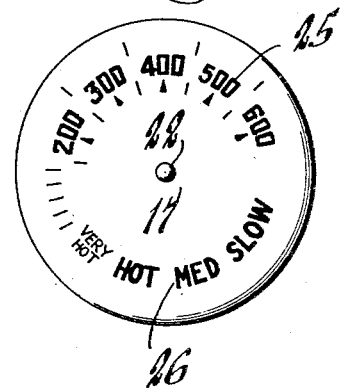
Inventor,
George J. Day,
by Walter P. Guyer
Attorney.

Patented Mar. 7, 1933

1,900,696

UNITED STATES PATENT OFFICE

GEORGE J. DAY, OF BUFFALO, NEW YORK

OVEN THERMOMETER

Application filed January 5, 1932. Serial No. 584,823.

This invention relates to a thermometer which is more particularly adapted for use in connection with the ovens of domestic stoves and the like.

One of its objects is the provision of a thermometer of this character which is so constructed and designed as to effect the ready reading thereof and which will simultaneously give the temperature reading as well as the condition of the oven, that is, whether "hot", "warm", etc.

Another object is to provide an oven thermometer which is simple, compact and inexpensive in construction, which is neat in appearance, and whose parts are so organized and arranged as to reduce friction to a minimum and render the thermometer accurate in its readings.

In the accompanying drawing:—

Figure 1 is a front elevation of an oven thermometer embodying my invention. Figure 2 is a transverse vertical section thereof taken on line 2—2, Figure 1. Figure 3 is a rear view of the thermometer. Figure 4 is a face view of the revolving dial plate.

Similar characters of reference indicate corresponding parts throughout the several views.

In the preferred embodiment of the invention shown in the drawing, the thermometer is shown as applied to an oven 10 having an opening 11 therein for receiving the thermometer, which consists of a casing including a cylindrical sleeve 12 engaging said opening and having an outwardly extending annular flange 13 at its front end to which is secured the face plate 14 of the thermometer. Arranged within the casing sleeve 12 is a base member 15 of substantially cup-shape in which is mounted the thermostatic element of the thermometer. The front or bottom wall of the base member 15 is spaced from the face plate 14 to provide a chamber 16 for receiving the indicating element 17 of the thermometer, as seen in Figure 2.

By way of example, the thermostatic element of the thermometer comprises a revolvable post 18 journaled at its rear end in a bearing bracket 19 extending across the interior of the base member 15 and journaled at its front end in a substantially conical bearing element 20 which projects forwardly from the bottom wall of the base member and against the outer end of which the inner side of the indicating element 17 is adapted to contact. This indicating element is preferably in the form of a circular dial plate which may be dished, as shown in Figure 2, and which is held in proper spaced relation to the adjoining casing wall and face plate by a washer 21 and head 22, respectively, the latter being formed on the front end of the post 18. Rigidly secured at its inner end to the rear end of the post, is a spiral or volute thermostatic element or spring 23, while its outer end is connected to a stationary lug 24 secured to the bracket 19.

On its front side or face the dial plate 17 is provided with an arcuate row of temperature indicia 25 which are arranged at one side of its axis. On the opposite side of its axis and companion to the temperature graduations is a like row of indicia 26 for indicating the oven condition at corresponding temperatures, the latter indicia indicating to the housewife whether the oven is "slow", "hot", etc., at the corresponding temperatures which are disposed diametrically opposite the oven-condition indicia. The face plate 14 is provided with sight openings 27 and 28 which are disposed about an axis coextensive with that of the indicating dial and through which the respective indicia 25 and 26 are visible as the dial revolves in response to the expansion and contraction of the spiral thermostatic element 23.

This improved thermometer, while simple, compact and inexpensive in construction, is neat in appearance, and enables the housewife at a glance to know the temperature of the oven as well as the heat condition of the oven corresponding to such temperature.

I claim as my invention:—

1. An oven thermometer, comprising a casing having a forwardly-facing projection thereon, a face plate applied to the front side of the casing in spaced overlying relation to its projection, said face plate having a sight opening therein, a thermostatic element applied to the casing and including a revolvable post projecting forwardly through said projection, and a dial plate secured to said post in the space between said face plate and said casing-projection and in bearing contact with the latter, said dial plate having temperature indicia thereon adapted to register with the sight opening in the face plate.

2. An oven thermometer, comprising a casing having a substantially conical bearing projecting forwardly from its front side, a face plate applied to the front of the casing in spaced relation to its conical bearing, said face plate having a sight opening therein, a thermostatic element applied to the casing and including a revolvable post projecting axially through said conical bearing, and a dished dial plate secured to said post in the space between said face plate and said bearing and in axial contact with the latter whereby said dial plate is held free from contact with the front side of the casing, the dial plate having temperature indicia thereon adapted to register with the sight opening in the face plate.

3. An oven thermometer, comprising a casing having a substantially conical bearing projecting forwardly from its front side, a face plate applied to the front of the casing in spaced relation to its conical bearing and having oppositely disposed sight openings therein disposed about an axis coextensive with that of said bearing, a thermostatic element applied to the casing and including a revolvable post projecting axially through the conical bearing, and a dial plate fixed on the front end of said post in the space between said face plate and said bearing and in axial contact with the latter, the dial having an arcuate row of temperature indicia at one side of its center and a like row of oven-condition indicia at the opposite side thereof for registering, respectively, with the sight openings in said face plate.

GEORGE J. DAY.